Dec. 16, 1969   A. C. KRACKLAUER   3,483,978
METHOD AND APPARATUS FOR MAINTAINING PLURAL FILTER
PLATES IN SPACED APART RELATION
Filed Sept. 5, 1968

Aloysius C. Kracklauer
INVENTOR

BY Arnold, Roylance,
Kruger & Durkee
ATTORNEYS

United States Patent Office 3,483,978
Patented Dec. 16, 1969

3,483,978
METHOD AND APPARATUS FOR MAINTAINING PLURAL FILTER PLATES IN SPACED APART RELATION
Aloysius C. Kracklauer, Conroe, Tex., assignor to Sparkler Manufacturing Company, Conroe, Tex., a corporation of Texas
Filed Sept. 5, 1968, Ser. No. 757,678
Int. Cl. B01d 29/04
U.S. Cl. 210—65                11 Claims

ABSTRACT OF THE DISCLOSURE

A clip, pin and bar system is provided for obtaining desired spacing for a plurality of filter plates in a filter tank. Longitudinal bars are disposed perpendicular to plural filter plates. Clips which may be positioned on the filter plates on one side are adapted to securely engage pins on the longitudinal bars, on the other.

A method of spacing filter plates in a filter tank is provided which includes fixing at least two longitudinal bars generally perpendicular to a plurality of filter plates, attaching a clip to each plate, and thence securing the other side of the clip to a longitudinal bar.

BACKGROUND OF THE INVENTION

This invention relates to apparatus and methods for conveniently retaining a plurality of plates in fixed, spaced, relation. More specifically, the invention relates to method and apparatus for fixing and retaining a plurality of spaced filter plates in spaced-apart and generally parallel relationship.

In recent years, industrial filtration processes have made more and more frequent use of large filtering tanks having disposed therein a plurality of spaced apart filter plates, for example, such as shown in U.S. Patent No. 3,344,922. For best results in the filtration process for which the system is designed, it is generally desirable to maintain these plates, whether horizontally or vertically oriented, in a predetermined spaced-apart relationship, usually parallel and uniformly positioned one from the other.

Typically, a manifold is positioned perpendicular to the plates, which manifold may extend through the center of the plates or along one edge thereof. The manifold communicates with the central portion of each filter plate to serve as an outlet for the filtered fluids therein. The manifold may have a connection to aid in the proper spacing and positioning of the plates.

The filter plates used in large industrial filters, however, are large, heavy, and bulky. They are cumbersome to handle, and it has been found that additional means are necessary in order to assure (or at least approximate) the desired positioning of the plates. At least one form of such additional means, and that preferred by applicant prior to the present invention, comprised a plurality of spaced U-clamps welded on longitudinal bars disposed perpendicular to the filter plates.

This system has, however, suffered from distinct disadvantages. For example, it has been quite difficult for workmen to force the heavy filter plates into the U-clamps. When doing so with great force, the clamps have sometimes become bent so as to defeat the whole purpose of their being there. And each time plates are forced into clamps in this manner, there is at least some risk of physical damage to the filter plate. As will be readily understood, physical damage to the filter plate cannot be tolerated. Further, such methods have not been entirely safe to the workmen.

As a result, the prior methods and apparatus have been time-consuming, cumbersome, expensive, and to some extent unreliable. Further, use of such prior art methods and apparatus has risked physical damage to equipment.

The present invention eliminates these disadvantages of the prior art, and provides a safe, quick, reliable and convenient manner for arranging a plurality of spaced-apart filter plates in a filter tank.

SUMMARY OF THE INVENTION

The invention provides convenient method and apparatus for accurately and conveniently assuring a desired spaced relationship for a plurality of filter plates in a filter tank.

The apparatus provided by the invention comprises at least two longitudinal bars disposed in a filter tank generally perpendicular to the filter plates therein. Each of these bars has thereon a plurality of spaced apart positioning pins, the pins being firmly affixed to the bars, as by welding. There is preferably one bar for each filter plate to be employed.

For cooperation with the positioning pins, a plurality of positioning clips are provided. Each such pin includes a couple of generally U-shaped plate sections, the base of the first section being joined to the leg of the second. A slot disposed in the leg of the second section is adapted for tightly fitting over a positioning pin. One such clip is desirably provided for each positioning pin.

According to the method of the invention, the longitudinal plates are fixed in position. A clip is then engaged with the edge of each filter plate. The opposite side of the clip is then slipped over the longitudinal bar, the slot on the clip fitting onto the positioning pin.

The system of the invention may be employed for either the vertical plate, or horizontal plate, type of filtration apparatus.

BRIEF DESCRIPTION OF THE DRAWINGS

In order that the invention may be more clearly understood, it will be explained with reference to the accompanying drawings, which form a part of this specification and wherein.

In order that the invention may be more clearly understood, it will be explained with reference to the accompanying drawings, which form a part of this specification and wherein.

DETAILED DESCRIPTION OF PREFERRED EMBODIMENT

Figure 1:
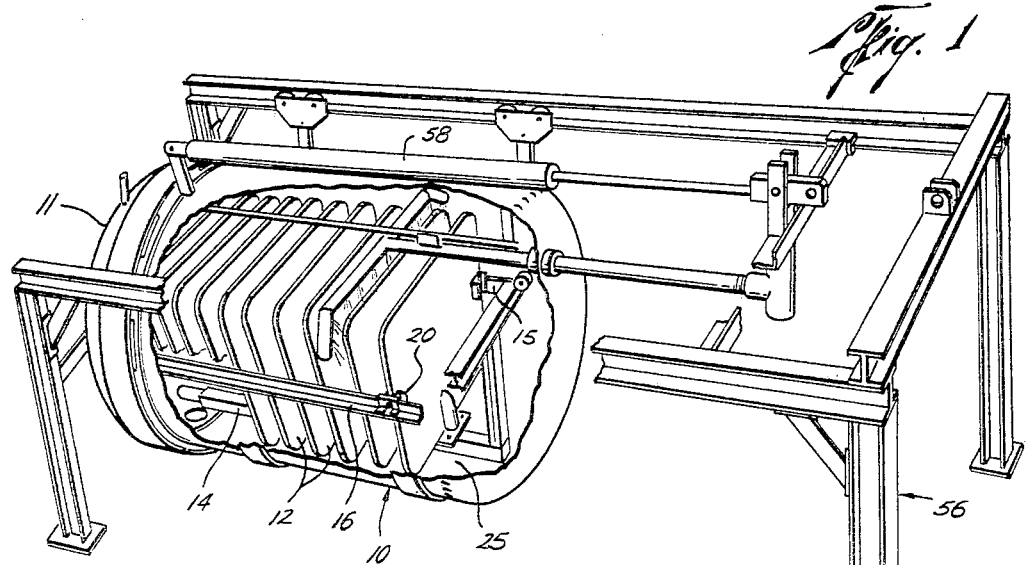
FIGURE 1 is a pictorial view of filtration equipment having disposed therein a plurality of spaced vertically oriented filter plates, and incorporating apparatus constructed in accordance with one desired embodiment of this invention.

Referring now to the drawings in greater detail, there is provided a filter unit comprising a filter tank 10, and a cover 11 adapted to fit onto the tank 10 in a manner such that a closed, fluid-tight filter chamber 25 is formed in which the filtration of fluids may occur. Filter tank and cover are supported by a suitable framework 56, and tank and cover are desirably separable one from the other in order to facilitate cleaning of the tank and changing of the plates. In this embodiment, the cover 11 is rigidly fixed to the framework 56, while the tank 10 is removable by means of a ram 58. Within the filtering chamber 25 are a plurality of vertically disposed and spaced apart filter plates 12. These plates 12 may be of any suitable type; such a plate typically includes a couple of spaced apart filter screens defining an interior filtrate chamber therebetween. The interior of each of the plates 12 is connected to an outlet manifold 14 which is disposed generally perpendicular to the individual filter plates 12. The manifold and filter plates are desirably held in fixed relationship with the filter tank cover 11.

The filter unit includes suitable inlet means for introducing fluid to be filtered into the tank. As the fluid passes through the filter plates, solid material is of course collected on the filter screens of the filter plates 12 while the filtrate enter the interior chamber thereof, from whence it is passed into the manifold 14. Filtrate from the manifold 14 exits from the tank through a suitable outlet opening. Filters constructed in the above manner are well known in the prior art, for example, in Kracklauer Patent No. 3,344,922.

For best results in the filtration process, it is important that the individual plates 12 be spaced apart in substantially parallel relation, by a distance which is substantially uniform from plate to plate. In this manner, the filter cake buildup on the various plates will be at least approximately uniform, and significant pressure drop differentials from one portion of the tank to another will be avoided. Efficient and substantially uniform filtration of the fluid in the tank will be the desired result.

Although it has long been known that this uniform and parallel spacing of filter plates is desired, and indeed such spacing has been extensively utilized in the prior art devices (such as that shown in the above mentioned patent No. 3,344,922), extreme difficulty has been encountered in obtaining and maintaining such spacing.

In the past, the filter plates have generally been positioned by means of racks (such as the racks 36 of Patent No. 3,344,922), typically one on each side of the tank. These racks may have U-clamps welded thereto for receipt of the filter plates. Typically in the prior art, the filter plates are first bolted onto the outlet manifold, and then forced on one side and then the other into the spaced U-clamps on racks such as the racks 36 of 3,344,922. While this procedure might at first appear to be without difficulty, it is found in actual practice that three or four workmen are required to force the filter plates into the U-clamps on the racks.

The apparatus and methods of this invention eliminate these problems with the prior art.

In accordance with the present invention, at least one elongate positioner bar is provided in the interior filter chamber 25. This positioner bar is affixed to the tank 10 or cover 11 and is disposed generally perpendicular to the filter plates 12. In the present embodiment, the bar is affixed to the cover 11 since the tank is removable.

If only a single positioner bar is employed, there must be considerable reliance on the outlet manifold connection to the plate. Such reliance is not usually desired, and consequently two or more such positioner bars are preferred, as in the present embodiment wherein a couple of positioner bars 15 and 16 are provided, one on each side of the filter tank. Each of the parallel bars 15 and 16 is disposed generally perpendicular to each of the filter pltaes 12, and generally parallel to the outlet manifold 14. Conveniently, the bars are positioned approximately half way between the top and bottom of the tank, and are adapted to be securely attached to the cover 11 by any suitable means such as detachable bolts.

The positioner bars 15 and 16 may be of any suitable shape, but each desirably includes a rather narrow upstanding fin or flange 42, and a base portion 40. The flange 42 and base portion 40 are, in this embodiment, joined together to form a generally L-shaped positioner bar.

Further in accordance with the invention, a plurality of retaining means are positioned at spaced points on each of said elongate bars.

Where plural bars are employed, the retaining means on each of the bars are aligned with the retaining means on the other bar or bars. Each of the spaced points at which said retaining means are loacted correspond to the location of a filter plate 12. These spaced points are desirably equidistant one from the other in order to provide for location of the plates 12 at regular uniform intervals. Such retaining means desirably comprise positioning pins 18 which are firmly secured as by welding to the positioner bars 15 and 16.

To operably engage both the filter plate 12 and the retaining means, a plurality of positioning means are provided. Such means desirably take the form of the clip illustrated in FIGURES 2–4.

One such positioner bar clip is provided for each positioner pin. Broadly speaking, each such clip includes a first part, and a second part securely joined to the first part. The first part fits onto a filter plate 12 without being securely attached thereto, and the second part fits onto the positioner bar 16 without being securely attached thereto. The second part, however, has a slot means for snugly fitting onto one of said positioning pins, to thereby retain the filter plate 12 in position on the bar 16, while at the same time allowing for quick removal of the plate from the bar when desired.

Figure 2:
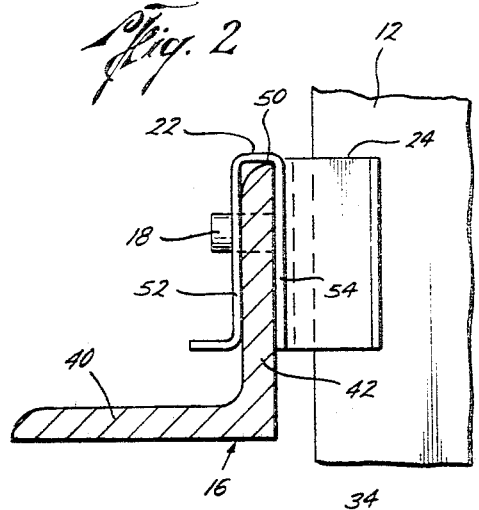
FIGURE 2 is a vertical sectional view taken through one of the vertical filter plates of the FIGURE 1 apparatus.
Figure 3:
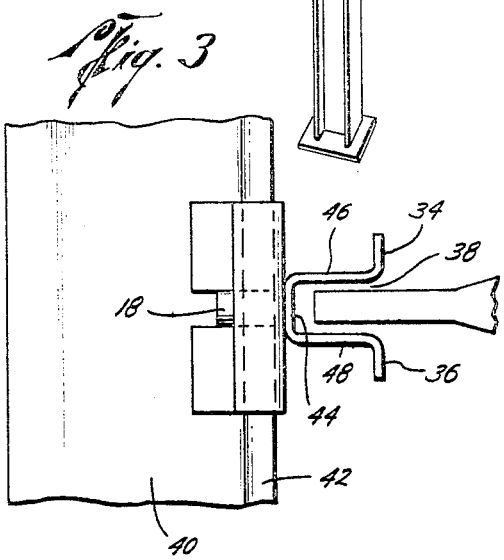
FIGURE 3 is a plan view of the portion of the apparatus shown in FIGURE 2.
Figure 4:
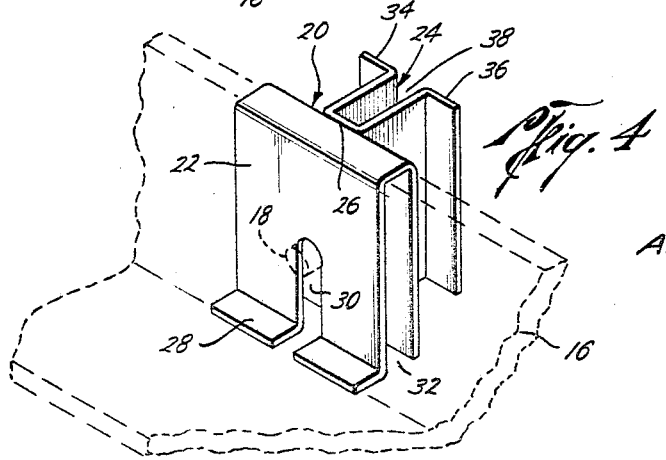
FIGURE 4 is a pictorial view showing in detatil a portion of the FIGURE 1 apparatus, namely that portion illustrated in FIGURE 2 and FIGURE 3.

Referring specifically to FIGURES 2–4, it is seen that the clip 20 of this embodiment comprises a first generally U-shaped plate section 24 and a second generally U-shaped plate section 22. The first generally U-shaped section 24 includes a base portion 44, and legs 46 and 48. Legs 46 and 48 terminate in outwardly turned flanges 34 and 36, respectively, each of which is generally parallel to the base 44. Second generally U-shaped section 22 comprises a base 50 and legs 52 and 54, leg 52 terminating in an outwardly turned flange 28 which is generally parallel to the base 50.

The back portion of base 44 of section 24 is firmly secured as by welding at 26 to the leg 54 of section 22, in a manner such that the longitudinal centerline of the base 44 corresponds to the longitudinal centerline of the leg 54. In this manner, the clip section 24 is centrally disposed on the clip section 22.

A slot 30 is provided in the leg 52 and flange 28 of clip section 22, opposite the base 44 of clip section 24. The center of slot 30 is aligned with the center of base 44. The width of slot 30 is approximately equal to the width of the pin 18.

Legs 52 and 54 of clip section 22 form an opening 32, and legs 46 and 48 of clip section 24 form an opening 38.

Opening 32 is of a size and configuration for fitting snugly onto the flange 42 of positioner bar 16; opening 38 is of a size and configuration suitable for receipt of filter plate 12.

In this manner, it is readily seen that when the clip 20 is positioned onto the bar 16 in a manner such that the flange 42 of bar 16 fits snugly into the opening 32 of clip 20, and the clip is held in place on the bar 16 by virtue of the placement of the pin 18 in slot 30, the filter plate 12 is positioned and retained in its desired location by means of the fitting of the edge of the filter plate into the opening 38 of the clip 20.

The apparatus provided as above described is simple, inexpense, and easy to use. But it is a significant advance in the filtration art.

According to the method of the invention, at least one elongate bar such as the bar 16 is securedly fixed to either tank of cover of the filter unit, the bar having spaced retaining means such as the pins 18 thereon. The bar is aligned perpendicular to the orientation desired for the filter plates 12.

A first filter plate is then provided, and the plate is appropriately joined to the outlet manifold. Positioning means such as a clip 20 is then provided, and one of the openings in the clip is fitted over the edge of a filter plate 12. Then the plate and clip are positioned such that another opening in the clip fits over the elongate bar. Fine positioning is then accomplished whereby the clip is rigidly held in place by the retaining means such as a pin 18. This may be done, for example, by fitting the slot 30 of a clip onto one of the pins 18.

Then, if plural elongate bars are provided, the same process is repeated for each of such bars.

Further, the method outlined above is repeated for each filter plate which it is desired to add to the filter unit.

The method thus provided is, as will be readily seen, distinctly superior to the prior art methods. It is quick, safe, reliable and accurate, and can be performed by only one or two workmen while the prior art methods required three or four.

Although the invention has been described in terms of an embodiment which is preferred as the best mode for accomplishing the invention known to the inventor at the time of this application, it will be understood by those of skill in the art, that various changes may be made in the particular structures and methods illustrated.

What is claimed is:

1. In a filter unit containing a plurality of filter plates, apparatus for positioning and retaining said plates in a desired spaced relationship, said apparatus comprising:
   at least one elongate bar in said unit and securely affixed thereto, said bar being disposed generally perpendicular to said filter plates;
   plural retaining means on said bar, said retaining means being positioned at spaced points on said bar,
      each of said spaced points corresponding to the desired position of one of said filter plates;
   positioning means having a first part, and a second part securely joined to said first part,
      said first part being adapted to fit onto one of said filter plates without being securely attached thereto,
      said second part being adapted to fit onto said bar without being securely attached thereto, and having a portion for fitting in snug relationship onto one of said spaced retaining means,
   said positioning means being thereby adapted to firmly hold said filter plate in position with respect to said bar while allowing for quick removal of said plate from said bar when desired.

2. Apparatus in accordance with claim 1, wherein said filter unit comprises a filter tank and cover, said tank being removable from said cover, and said elongate bar being bolted to said cover.

3. Apparatus in accordance with claim 1, wherein said retaining means comprise pins welded on said elongate bar and protruding therefrom, and the second part of each of said positioning means contains a slot for fitting in snug relationship over one of said pins.

4. Apparatus in accordance with claim 1, wherein said positioning means comprises a clip,
   a first part of said clip being of generally U-shaped configuration defining a base and two legs,
   a second part of said clip being of generally U-shaped configuration, defining a base and two legs,
   the base of said first part being joined throughout its length to one of the legs of said second part, and,
   the other leg of said second part having a slot therein for snugly fitting onto said retaining means.

5. Apparatus in accordance with claim 1, wherein one positioning means is included on said bar for each plate, and said retaining means are spaced equidistant one from the other.

6. In a filter unit containing a plurality of filter plates, apparatus for positioning and retaining said plates in a desired spaced relationship, said apparatus comprising:
   a filter tank;
   a cover for said tank adapted to fit onto said tank to form a closed filter chamber in which filtration of fluids may occur;
   a plurality of filter plates disposed in said filter chamber;
   at least two elongated bars positioned in said chamber, securely affixed to one of said tank or said cover, said bars being disposed generally perpendicular to said filter plates;
   plural retaining means on said bars, said retaining means being positioned at spaced points on said bars, each retaining means on one bar being aligned with retaining means on another bar,
      each of said spaced points corresponding to one of said filter plates;
   positioning means having a first part and a second part securely joined to said first part,
      said first part fitting onto one of said filter plates without being securely attached thereto,
      said second part snugly fitting onto one of said spaced retaining means on said elongate bar,
   said positioning means thereby firmly holding said filter plate in position with respect to said bar, while allowng for quick removal of said plate from said bar when desired.

7. Apparatus in accordance with claim 6, wherein said retaining means comprise pins welded on said elongate bar and protruding therefrom, and the second part of each of said positioning means contains a slot for fitting in snug relationship over one of said pins.

8. Apparatus in accordance with claim 6, wherein said positioning means comprises a clip.
   a first part of said clip being of generally U-shaped configuration defining a base and two legs,
   a second part of said clip being of generally U-shaped configuration, defining a base and two legs,
   the base of said first part being joined throughout its length to one of the legs of said second part, and,
   the other leg of said second part having a slot therein for snugly fitting onto said retaining means.

9. Apparatus in accordance with claim 6, wherein one positioning means is included on said bar for each plate, and said retaining means are spaced equidistant one from the other.

10. In a filter unit for containing a plurality of filter plates, a method for positioning and retaining said plates in said unit in a desired spaced relationship, comprising:
    securely fixing at least two elongate bars having retaining means thereon, to said filter unit, generally perpendicular to the desired orientation of said filter plates;
    providing a first filter plate;
    providing a clip suitable for fitting onto said filter plate without being secured thereto, and for fitting onto said elongate bar without being secured thereto;
    fitting said clip onto one side of said filter plate;
    thence fitting said clip onto a retaining means of one of said elongate bars, whereby said clip is retained thereon;
    fitting another portion of said filter plate onto another of said elongate bars in the same manner; and,
    providing further filter plates and positioning said filter plates with respect to said elongate bars in the same manner.

11. In a filter unit for containing a plurality of filter plates, a method for positioning and retaining said plates in said unit in a desired spaced relationship, comprising:
    securely fixing an elongate bar having retaining means thereon, to said filter unit, generally pedpendicular to the desired orientation of said filter plates;
    providing a first filter plate;
    providing a clip suitable for fitting onto said filter plate without being secured thereto, and for fitting onto said elongate bar without being secured thereto;

fitting said clip onto one side of said filter plate;

thence fitting said clip onto a retaining means of said elongate bar, whereby said clip is detachably retained thereon; and providing further filter plates and positioning said filter plates with respect to said elongate bars in the same manner.

References Cited

UNITED STATES PATENTS 2,843,267    7/1958    Anderson _____ 210—236

REUBEN FRIEDMAN, Primary Examiner

T. A. GRANGER, Assistant Examiner

U.S. Cl. X.R.

210—232